(12) United States Patent
Teng et al.

(10) Patent No.: US 7,990,338 B2
(45) Date of Patent: Aug. 2, 2011

(54) ELECTRONIC DEVICES HAVING COMPLEMENTARY DUAL DISPLAYS

(75) Inventors: Albert Teng, Cupertino, CA (US); Jack Yuan, Cupertino, CA (US)

(73) Assignee: Spring Design Co., Ltd, Taipei (TW)

( * ) Notice: Subject to any disclaimer, the term of this patent is extended or adjusted under 35 U.S.C. 154(b) by 548 days.

(21) Appl. No.: 11/702,789

(22) Filed: Feb. 5, 2007

(65) Prior Publication Data

US 2008/0072163 A1 Mar. 20, 2008

Related U.S. Application Data

(63) Continuation-in-part of application No. 11/602,627, filed on Nov. 20, 2006.

(60) Provisional application No. 60/848,538, filed on Sep. 29, 2006, provisional application No. 60/844,979, filed on Sep. 14, 2006, provisional application No. 60/850,013, filed on Oct. 6, 2006.

(51) Int. Cl.
*G09G 5/00* (2006.01)

(52) U.S. Cl. .............................. 345/1.3; 345/3.1; 345/3.4

(58) Field of Classification Search ............ 345/1.1–1.3, 345/3.1, 3.4
See application file for complete search history.

(56) References Cited

U.S. PATENT DOCUMENTS

| | | | |
|---|---|---|---|
| 5,488,572 A * | 1/1996 | Belmont | 710/62 |
| 5,493,335 A * | 2/1996 | Parulski et al. | 348/231.6 |
| 5,847,698 A | 12/1998 | Reavey et al. | |
| 6,336,161 B1 * | 1/2002 | Watts | 711/103 |
| 6,353,700 B1 * | 3/2002 | Zhou | 386/68 |
| 6,628,244 B1 | 9/2003 | Hirosawa et al. | |
| 6,931,265 B2 | 8/2005 | Reyes et al. | |
| 7,748,634 B1 | 7/2010 | Zehr et al. | |
| 2002/0067319 A1 | 6/2002 | Hensel | |
| 2002/0126133 A1 | 9/2002 | Ewins | |
| 2002/0149541 A1 * | 10/2002 | Shin | 345/3.1 |

(Continued)

FOREIGN PATENT DOCUMENTS

EP 1205824 A2 5/2002

OTHER PUBLICATIONS

PCT International Search Report & Written Opinion mailed Mar. 25, 2008 re PCT/US2007/078208.

(Continued)

*Primary Examiner* — Kevin Nguyen
*Assistant Examiner* — Jonathan Boyd
(74) *Attorney, Agent, or Firm* — Fenwick & West LLP (57) ABSTRACT

Electronic devices having complementary dual displays are presented, the electronic devices including: a first display, wherein the first display is a refresh-based, high frame rate display; a first display controller for outputting an internal video signal to the first display; a second display, wherein the second display is a bistable, low frame rate display; and a second display controller for outputting the internal video signal to the second display. In some embodiments, the devices further include: a number of user input interfaces for receiving a user input, wherein the number of user input interfaces are configured to control the second display; and a user input controller for generating a control signal based on the user input, the user input controller in electronic communication with the number of user input interfaces and a processing unit of the electronic device.

37 Claims, 9 Drawing Sheets

U.S. PATENT DOCUMENTS

| | | |
|---|---|---|
| 2002/0158812 A1 | 10/2002 | Pallakof |
| 2003/0011534 A1* | 1/2003 | Rengan et al. ............... 345/1.1 |
| 2003/0160771 A1* | 8/2003 | Fraser et al. ................. 345/204 |
| 2004/0190080 A1* | 9/2004 | Kodama et al. .............. 358/474 |
| 2004/0196210 A1* | 10/2004 | Nagatsuka et al. ........... 345/1.1 |
| 2004/0225613 A1* | 11/2004 | Narayanaswami et al. ..... 705/64 |
| 2004/0257367 A1* | 12/2004 | Smith et al. .................. 345/441 |
| 2005/0225556 A1 | 10/2005 | Booth |
| 2006/0017659 A1* | 1/2006 | Ogawa et al. .................. 345/30 |
| 2006/0050090 A1 | 3/2006 | Ahmed et al. |
| 2006/0077127 A1* | 4/2006 | Sampsell et al. ............... 345/55 |
| 2006/0083194 A1* | 4/2006 | Dhrimaj et al. .............. 370/328 |
| 2006/0146056 A1* | 7/2006 | Wyatt ........................... 345/501 |
| 2006/0161977 A1* | 7/2006 | Jung et al. ..................... 726/21 |
| 2006/0187142 A1 | 8/2006 | Lesniak |
| 2006/0197724 A1* | 9/2006 | Sakai ............................. 345/87 |
| 2007/0118671 A1 | 5/2007 | Ganti |
| 2007/0174918 A1* | 7/2007 | Hirose et al. ................... 726/26 |
| 2007/0182663 A1* | 8/2007 | Biech ............................ 345/1.1 |
| 2008/0033996 A1 | 2/2008 | Kesari |
| 2008/0080010 A1* | 4/2008 | Korst ........................... 358/401 |

OTHER PUBLICATIONS

PCT International Search Report & Written Opinion mailed Mar. 25, 2008 re PCT/US2007/078209.

Chinese First Office Action, Chinese Application No. 200780034341.9, Mar. 31, 2011, 21 pages.

* cited by examiner

ELECTRONIC DEVICES HAVING COMPLEMENTARY DUAL DISPLAYS

CROSS REFERENCE TO RELATED APPLICATIONS

The present application is a Continuation-in-Part of co-pending U.S. patent application Ser. No. 11/602,627, entitled, "ELECTRONIC DEVICES HAVING COMPLEMENTARY DUAL DISPLAYS," filed on Nov. 20, 2006 now abandoned, which is incorporated herein by reference.

The present application is related to the following application, which is incorporated herein by reference: Commonly assigned U.S. patent application Ser. No. 11/702,788 entitled "METHODS FOR CONTROLLING COMPLEMENTARY BISTABLE AND REFRESH-BASED DISPLAYS," filed on even date herewith by the same inventors herein.

PRIORITY CLAIM TO PROVISIONAL APPLICATION

A claim for priority is hereby made under the provisions of 35 U.S.C. §119 for the present application based upon U.S. Provisional Application No. 60/848,538, filed on Sep. 29, 2006, which is incorporated herein by reference; upon U.S. Provisional Application No. 60/844,979, filed on Sep. 14, 2006, which is incorporated herein by reference; and upon U.S. Provisional Application No. 60/850,013 filed on Oct. 6, 2006, which is incorporated herein by reference.

BACKGROUND

Portable electronic devices such as Ultra Mobile PC (UMPC), laptop, personal digital assistants (PDAs), cellular phones, portable digital media players, and the like are becoming ubiquitous in modern technological societies. These devices offer specialized functionality in form factors small enough to carry in a pocket or some other small carrying bag. At least one reason why these types of devices are so popular is because display technology, which provides a convenient user interface, has advanced to a point where relatively small form factors are efficient and inexpensive. Indeed, even the most inexpensive portable electronic devices now include high frame rate color displays. However, conventional displays are not without some disadvantages.

Figure 1:
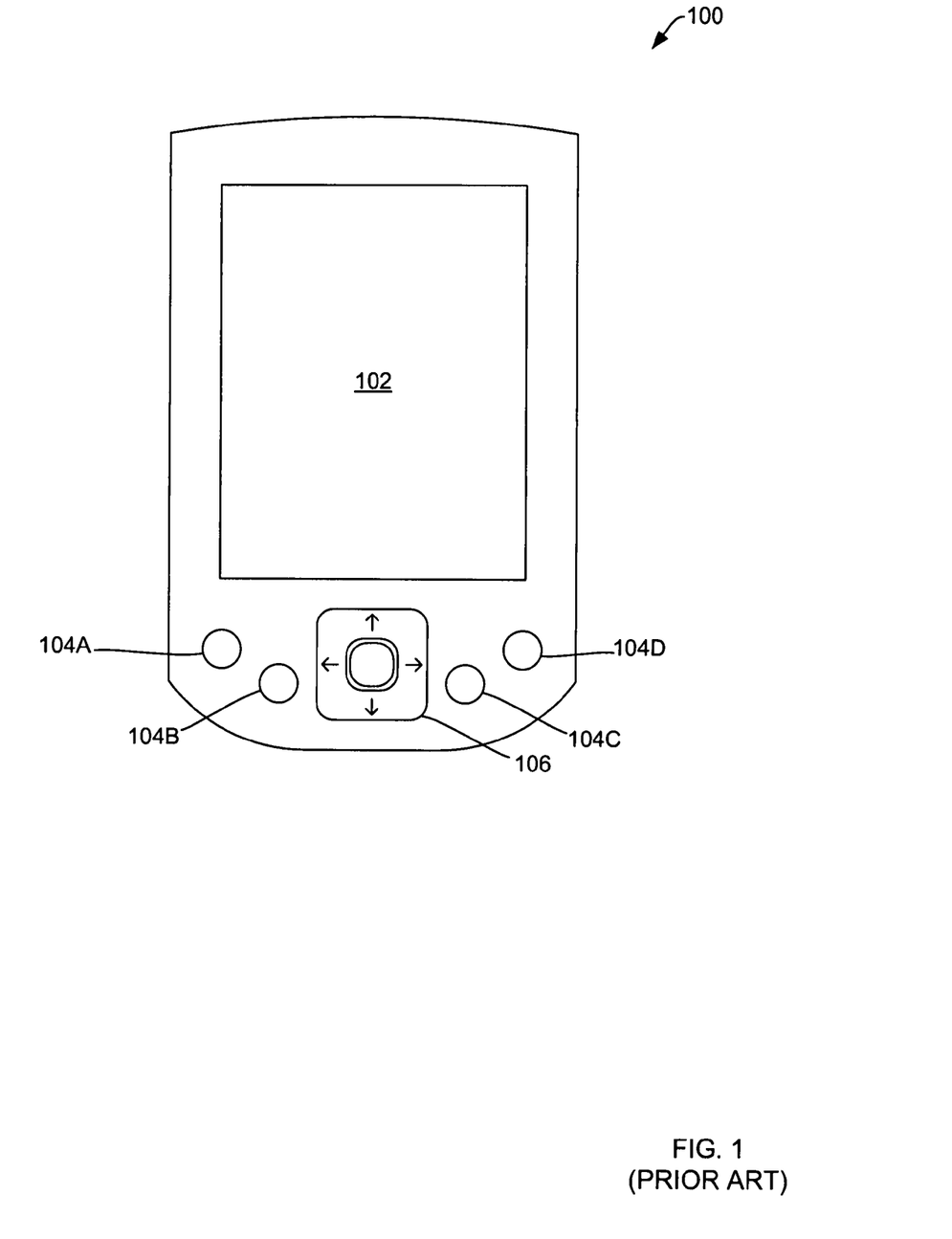
FIG. 1 is a prior art representation of a PDA.

For example, FIG. 1 is a prior art representation of a PDA 100. PDA 100 may include multipurpose navigation button 106 or any number of specific purpose navigation buttons 104A-D. These latter buttons may be utilized to provide convenient access to commonly utilized features. As illustrated, PDA 100 may further include a display 102 for displaying user selected information. Typically, display 102 is a liquid crystal display (LCD). LCDs have many desirable characteristics including high screen refresh rates (up to 85 Hz today for flat panels) which provide for a satisfying visual experience when rapidly switching between screens or when scrolling across a screen. However, typical displays having high screen refresh rates may suffer from poor readability because backlights, which are required in those displays, may be adversely affected by ambient lighting conditions. Eye strain is commonly reported by users and has been documented in some medical literature. Users of UMPCs or PDAs are familiar with the poor readability of LCDs under bright light or direct sunlight. In some examples, shading the screen or moving to a darker environment may be necessary to read an LCD.

Further, as may be appreciated, an LCD requires a backlight to illuminate the pixels being displayed. Because a backlight is required, PDAs may utilize power savings algorithms to power down the LCD after a specified time interval. In some conventional methods, various levels of backlight illumination may be utilized in a power saving algorithm. However, when a user is reading a document on a PDA, the time to complete reading may often exceed the power down time interval thus disrupting and diminishing a user's experience when the backlight is abruptly powered down. Furthermore, in some examples, where a user adjusts power settings to reduce power down events in order to avoid unwanted disruption, battery life may, in some examples, fall precipitously. One of the best battery-saving design is a bistable display, which has the ability to retain on-screen images even after the power has been turned off. In a bistable display, picture elements (i.e. pixels) are stable in two (or more) states. Thus, a bistable display requires power only when the content changes. Reading a bistable display is more like reading paper because no backlight element is required. Bistable displays may also be less stressful to eyes than typical high screen refresh rate displays such as an LCD.

It may, therefore, be desirable to provide a complementary display to conventional portable electronic device displays which provides a highly readable display that overcomes harsh ambient light conditions and that does not overly diminish battery life. As such, electronic devices having complementary bistable and refresh-based displays are provided herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Electronic devices having complementary dual displays are presented, the electronic devices including: a first display, wherein the first display is a refresh-based, high frame rate display; a first display controller for outputting an internal video signal to the first display; a second display, wherein the second display is a bistable, low frame rate display; and a second display controller for outputting the internal video signal to the second display. In some embodiments, the devices further include: a number of user input interfaces for receiving a user input, wherein the number of user input interfaces are configured to control the second display; and a user input controller for generating a control signal based on the user input, the user input controller in electronic communication with the number of user input interfaces and a processing unit of the electronic device. In some embodiments, the second display controller further includes a frame buffer for storing a number of frames for display on the second display. In some embodiments, the first includes: an LCD display, a CRT display, and LED display, a PLED display, an OLED display, and a plasma display. In some embodiments, the second display is an electronic paper display (EPD). In some embodiments, the control signal includes: pan, flip, wipe, clean, restore, page up, page down, search, migrate, and zoom.

In other embodiments, electronic devices having complementary dual displays are presented, the electronic device including: first display means, wherein the first display means is a refresh-based, high frame rate display; first display controller means for outputting an internal video signal to the first display means; second display means, wherein the second display means is a bistable, low frame rate display; second display controller means for outputting the internal video signal to the second display means, wherein the second display controller means includes a frame buffer for storing a number of frames for display on the second display means; a number of user input interface means for receiving a user input, wherein the number of user input interface means are configured to control the second display means; and a user input controller means for generating a control signal based on the user input, the user input controller means in electronic communication with the number of user input interface means and processing means of the electronic device.

In other embodiments, external display devices for use as a complementary display with an electronic device, the electronic device having a first display are presented, the external display device includes: an external display, wherein the external display is a bistable, low frame rate display, wherein the external display is configured to operate substantially simultaneous with the first display, and wherein the external display is further configured to operate independently of the electronic device; an external display controller for outputting a video signal to the external display; a frame buffer for storing a number of frames for display on the external display; a connection interface for electronically connecting the external display with the electronic device; a number of user input interfaces for receiving a user input, wherein the number of user input interfaces are configured to provide control for the external display; a user input controller for generating a control signal based on the user input, the user input controller in electronic communication with the number of user input interfaces; and a power supply for providing power when the external display device is not connected with the electronic device. In some embodiments, the external display device further includes: a processing unit for providing computing functions for the device and for processing the control signal; a random access memory (RAM) storage device for providing volatile storage for the processing unit; and a flash memory storage device for providing non-volatile storage for the processing unit. In some embodiments, the external display devices further include: an audio controller for providing audio playback; and an audio interface for connecting with an audio listening device.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 2:
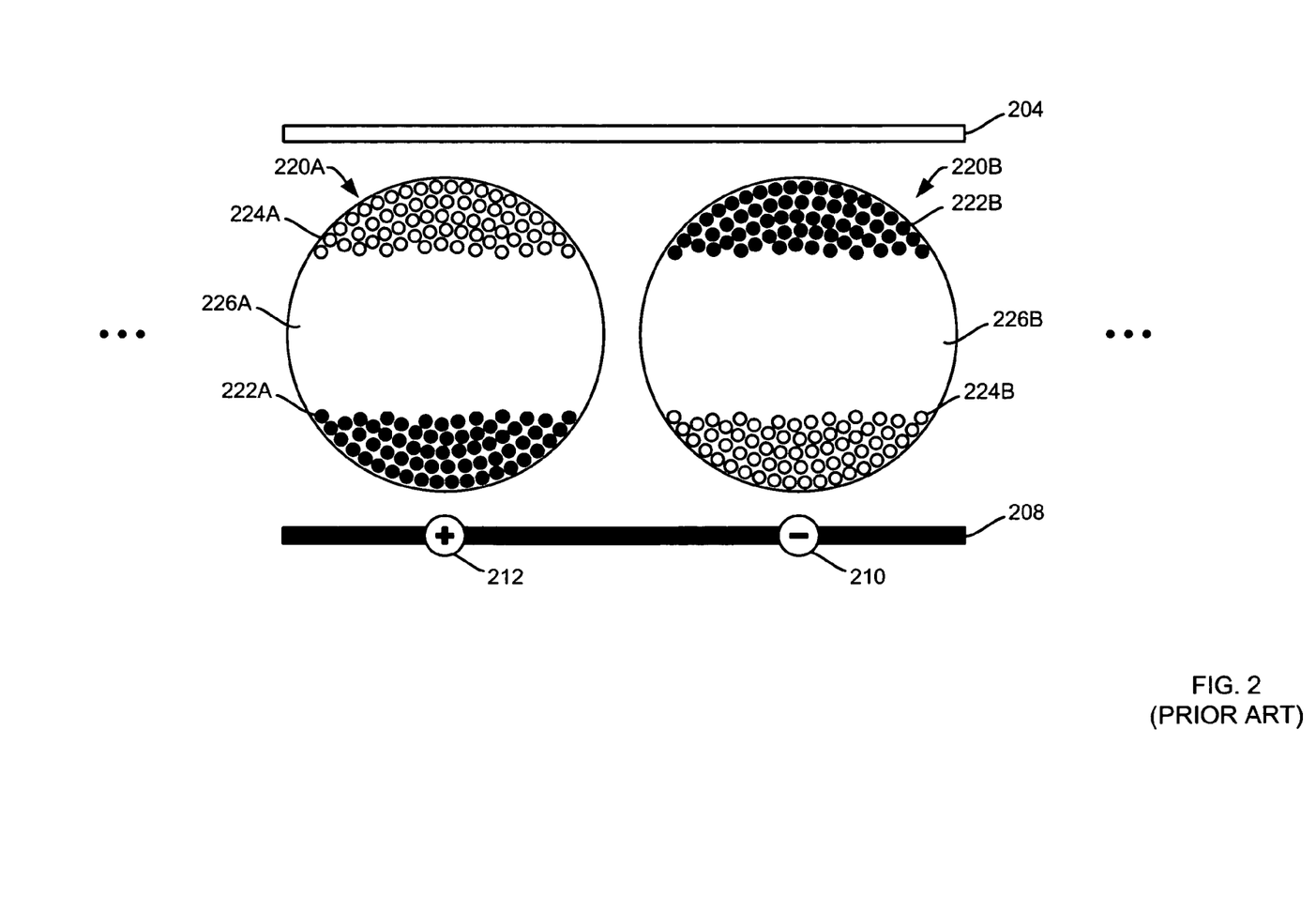
FIG. 2 is a prior art representation of a portion of an electronic paper display (EPD), which is a bistable display.

FIG. 2 is a prior art representation of a portion of an electronic paper display (EPD), which is a bistable display. EPDs utilize a material called electronic ink and are commercially available under the trade name E INK® although other similar displays are available from various manufacturers. Electronic ink includes millions of tiny microcapsules 220A and 220B, each about the diameter of a human hair. Thus, a pixel (or dot) may include many microcapsules. As such, the density of microcapsules in an EPD is generally much greater than the density of pixels in an LCD. In some embodiments, an EPD may be configured with at least 120 dots per inch (DPI). In the example illustrated, each microcapsule 220A and 220B contains positively charged white particles 224A and 224B and negatively charged black particles 222A and 222B suspended in a clear fluid 226A and 226B. When a negative electric field is applied across top electrode 204 and bottom electrode 208, positively charged white particles 224A move to the top of microcapsule 220A where they become visible to the user. This makes the surface appear white at that spot. At the same time, an opposite electric field 212 pulls the negatively charged black particles 222A to the bottom of microcapsule 220A where they are hidden. By reversing this process and applying a positive electric field across top electrode 204 and bottom electrode 208, negatively charged black particles 222B appear at the top of microcapsule 220B, which now makes the surface appear dark at that spot. At the same time, an opposite electric field 210 pulls the positively charged white particles 224B to the bottom of microcapsule 220B where they are hidden To form an E INK® electronic display, electronic ink may be printed onto a sheet of plastic film that is laminated to a layer of circuitry. The circuitry forms a pattern of pixels that can then be controlled by a display driver or controller. The electronic ink is composed of microcapsules, which carry charged particles, which are suspended in a liquid "carrier medium" allowing them to be printed using existing screen printing processes onto virtually any surface, including glass, plastic, fabric, and even paper.

As may be appreciated, EPDs and other similar bistable displays are ideally suited for flexible display applications due to their thin form factor and inherent flexibility. EPDs provide an image stable reflective display technology that uses ultra-low power but is easily read under any lighting condition including direct sunlight. In addition, EPDs provide a bistable display and unlike LCDs, the image on an EPD looks the same from all viewing angles. Further, EPDs will not distort when touched or flexed, making EPDs the ideal display medium for flexible displays and portable devices. EPDs however, cannot, in many examples, completely replace LCDs. At least one reason is because EPDs typically have a low frame rate. As noted above, conventional LCDs may have high frame rates. High frame rates may serve to enhance a user's viewing experience especially when rapidly scrolling through multiple displays. In addition, using a mouse requires high frame rates so that the mouse pointer appears to have smooth movement across a screen. However, when a user is reading a body of text, a high frame rate may not be required. In those examples, a low frame rate EPD will not detract from a user's viewing experience and may be less stressful to the eyes.

EPDs also provide for better viewing without penalizing battery life. Because EPDs do not require backlighting, EPDs are not adversely affected by harsh ambient lighting conditions. Thus, integrations of EPDs maintain suitable contrast for nearly all lighting conditions. Still further, EPDs produce static images. That is, EPDs do not require a constant power supply to maintain an image. As noted above, charges applied across top and bottom electrodes cause charged black and white particles to migrate either up or down across a microcapsule. Once that migration has occurred, no additional charge is required to maintain the image. That is, a static image is produced which does not further consume power. As such, display may be viewed for long periods of time without adversely affecting battery life.

Figure 3:
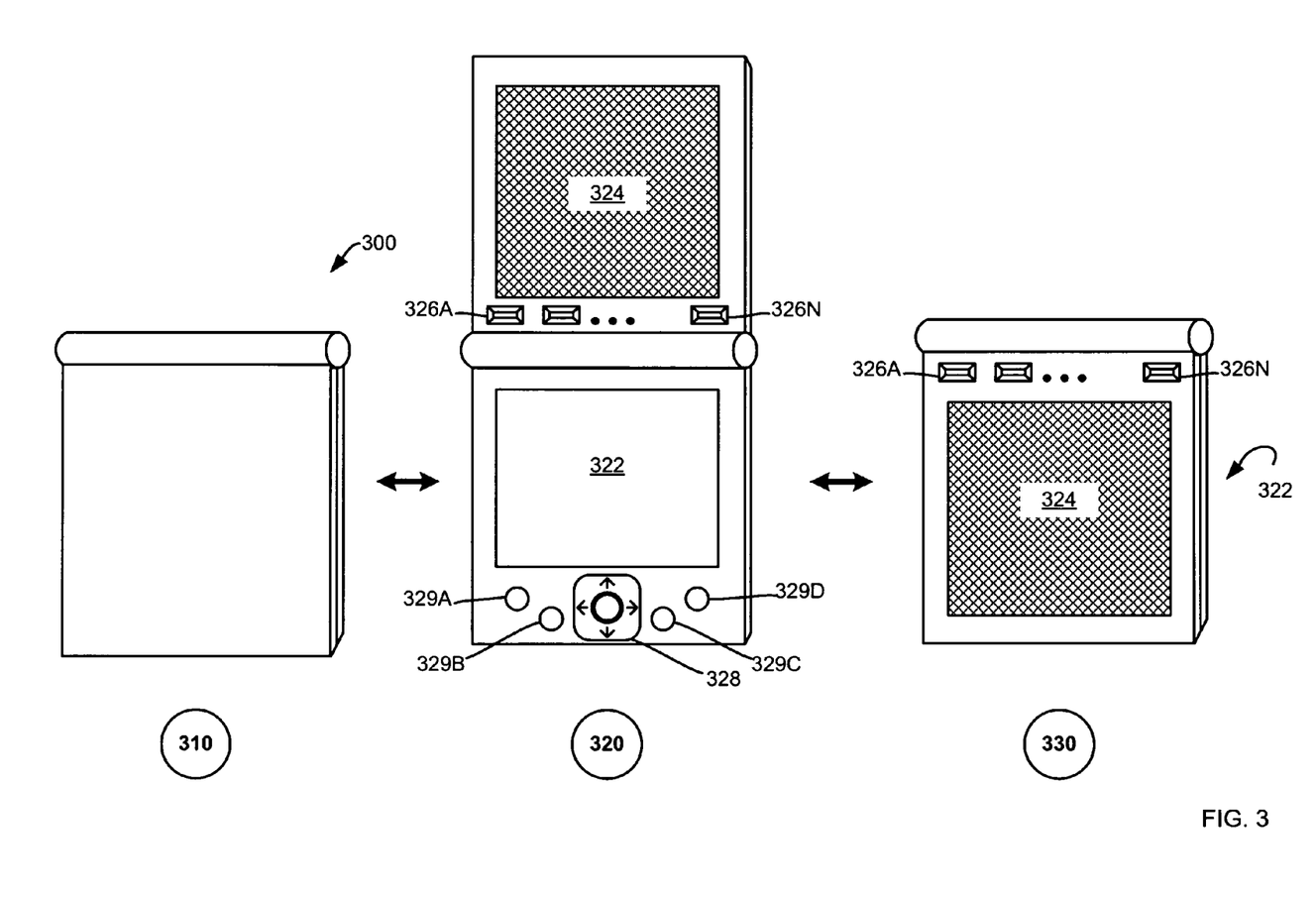
FIG. 3 is a illustrative representation of complementary dual screens embodied in a PDA in accordance with embodiments of the present invention.

FIG. 3 is an illustrative representation of complementary dual screens embodied in a PDA 300 in accordance with embodiments of the present invention. As illustrated, PDA 300 is shown in closed position 310; half-open position 320; and full-open position 330. Closed position 310 provides a protective position for PDA 300. Half-open position 320 provides for simultaneous use of complementary dual displays 322 and 324. Full-open position 330 provides for use of either of complementary dual displays 322 and 324. PDA 300 includes a refresh-based, high frame rate (REHF) display 322. Typically, display resolution is determined by the number of pixels contained within one square inch of display space. In some embodiments, an REHF may be utilized which have a resolution in the range of approximately 90 to 230 pixels per inch (PPI). In other embodiments, an REHF may be utilized which have a resolution of up to approximately 600 PPI. In contrast, as noted above, in an EPD, many microcapsules make up a pixel. As such, the density of microcapsules (or dots) in an EPD is generally much greater than the density of pixels in an REHF which may, in some embodiments, result in a sharper image. Embodiments utilizing REHF displays may include: an LCD, a CRT display, an LED display, a PLED display, an OLED display, and a plasma display, which may be utilized equally without departing from the present invention. In some embodiments, REHF displays may be utilized which are configured to a frame rate in the range of approximately 10 to 120 frames per second (fps); more preferably to a frame rate of approximately 30 fps. Navigation corresponding with REHF display 322 may be accomplished using multipurpose navigation button 328 or any number of specific purpose navigation buttons 329A, 329B, 329C, and 329D.

PDA 300 may be further configured with a bistable, low frame rate (BILF) display 324. In one embodiment, the BILF display is an EPD. In some embodiments, BILF displays may be configured to a frame rate in the range of approximately less than 1 to 2.5 fps; more preferably to a frame rate of up to approximately 10 fps. As illustrated, REHF display 322 is located below BILF display 324. However, as may be appreciated, displays may be configured in any of a number of positions without departing from the present invention. Navigation corresponding with BILF display 324 may be accomplished using any number of user input interfaces 326A-N. As may be appreciated, any number of configurations of user input interfaces may be utilized without departing from the present invention. For example, in one embodiment, a user input interface may be configured as a button having any number of shapes. In another embodiment, a user input interface may include multipurpose buttons. As may be appreciated, user input interfaces may be configured in any of a number of positions without departing from the present invention. Thus, user input interfaces, as illustrated, are for clarity's sake in further describing embodiments of the present invention and are not intended as limiting with respect to the present invention.

User input interfaces, generally, may be utilized in association with a user input controller, which generates a control signal based on user input. Control signals may include, for example, pan, flip, wipe, clean, restore, page up, page down, search, migrate, and zoom. Pan provides for horizontal screen display adjustment. Flip provides for flipping a screen display upside down when a device is moved from a half-open position, such as half-open position 320, to a full-open position, such as full-open position 300. Wipe provides for clearing a screen display. Clean provides for removing artifacts from a screen display. Restore provides for restoring a wiped screen display. Page up and page down provides for vertical screen display adjustment. Search provides for some searching capability which may include: a scroll search that operates by scrolling through a document over a fixed or user specified number of pages; a percentage scroll search that operates by scrolling through a document over a fixed or user specified percentage; or a page search that operates by retrieving a user specified page number. Migrate provides for switching either the entire screen or the application focus between a BILF and an REHF. Methods for controlling complementary dual displays are further disclosed in related U.S. patent application Ser. No. 12/910,723 entitled "METHODS FOR CONTROLLING COMPLEMENTARY BISTABLE AND REFRESH-BASED DISPLAYS," which is hereby incorporated by reference in its entirety.

Figure 4:
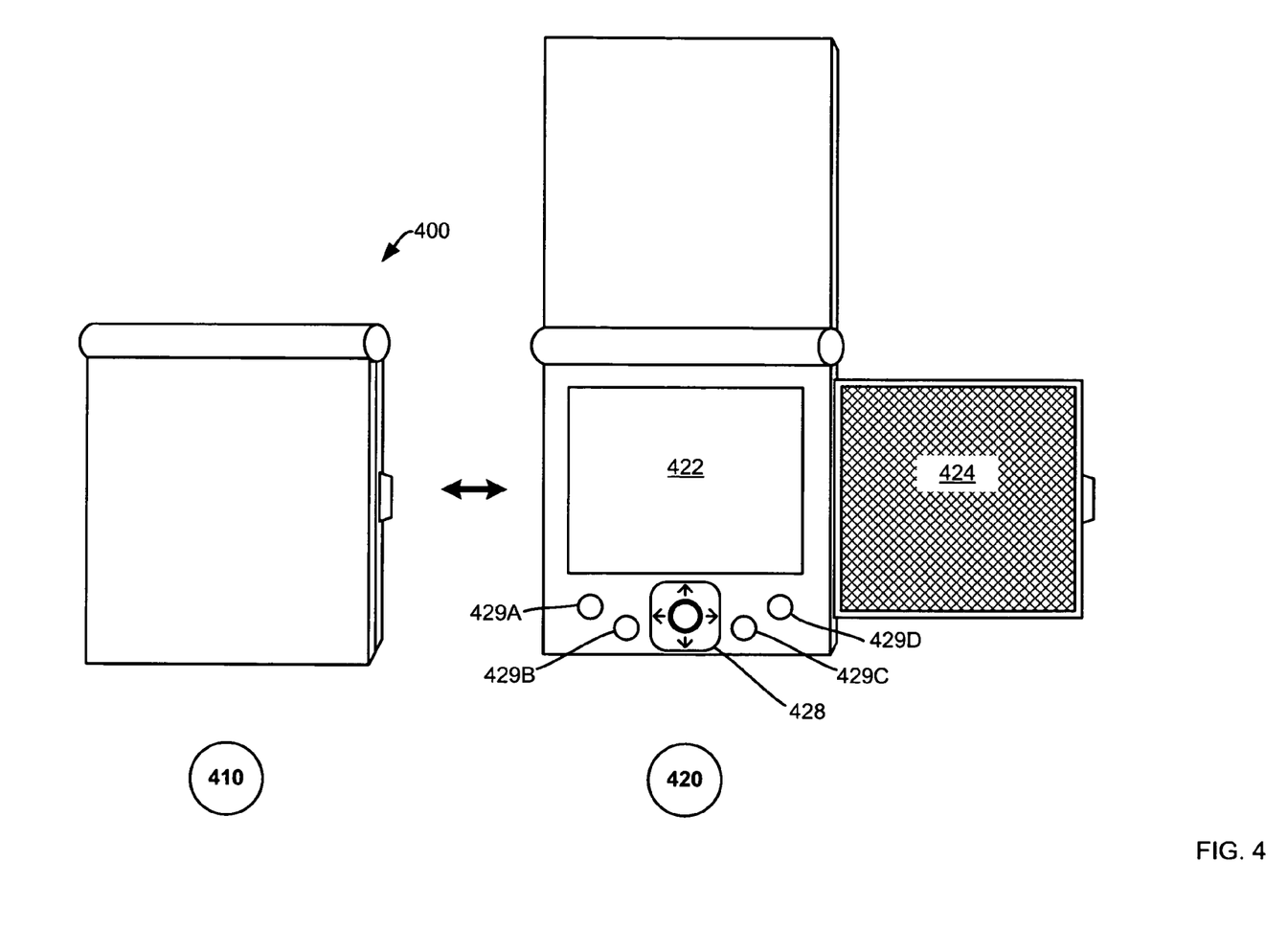
FIG. 4 is an illustrative representation of complementary dual screens embodied in a PDA in accordance with embodiments of the present invention.

FIG. 4 is an illustrative representation of complementary dual screens embodied in a PDA in accordance with embodiments of the present invention. As illustrated, PDA 400 is shown in closed position 410; half-open position 420; and full-open position 430. Closed position 410 provides a protective position for PDA 400. Half-open position 420 provides for simultaneous use of complementary dual displays 422 and 424. PDA 400 includes a REHF display 422. Embodiments utilizing REHF displays may include: an LCD, a CRT display, an LED display, a PLED display, an OLED display, and a plasma display, which may be utilized equally without departing from the present invention. In some embodiments, an REHF may be utilized which have a resolution in the range of approximately 90 to 230 pixels per inch (PPI). In other embodiments, an REHF may be utilized which have a resolution of up to approximately 600 PPI. In some embodiments, REHF displays may be utilized which are configured to a frame rate in the range of approximately 10 to 120 fps. Navigation corresponding with LCD 422 may be accomplished using multipurpose navigation button 428 or any number of specific purpose navigation buttons 429A, 429B, 429C, and 429D.

PDA 400 may be further configured with a BILF display 424. In one embodiment, the BILF display is an EPD bistable display. In some embodiments, BILF displays may be configured to a frame rate in the range of approximately less than 1 to 2.5 fps; more preferably to a frame rate of up to approximately 10 fps. As illustrated, recessing BILF display 424 may be located along side of REHF display 422. However, BILF displays may be recessed within any suitable location on an electronic device without departing from the present invention. Further, as noted above, EPDs are ideally suited for flexible display applications due to their thin form factor and inherent flexibility. Thus, in some embodiments, EPDs may be recessed into a curved recess to accommodate a given form factor without departing from the present invention. For example, a portable computing device may utilize an enclosed EPD that is rolled within a base. By rolling the EPD, space savings may be achieved. In addition, extending an EPD from a device may, in some embodiments, trigger an auto migration command. As noted above, migration may provide for switching either the entire screen or the application focus between the BILF and REHF.

Navigation corresponding with BILF display 424 may be accomplished using any number of user input interfaces 429A, 429B, 429C, and 429D, which may be utilized to control both complementary displays in some embodiments. As may be appreciated, any number of configurations of user input interfaces may be utilized without departing from the present invention. For example, in one embodiment, a user input interface may be configured as a button having any number of shapes. In another embodiment, a user input interface may include multipurpose buttons. As may be appreciated, user input interfaces may be configured in any of a number of positions without departing from the present invention. Thus, user input interfaces, as illustrated, are for clarity's sake in further describing embodiments of the present invention and are not intended as limiting with respect to the present invention. User input interfaces, generally, may be utilized in association with a user input controller, which generates a control signal based on user input. Control signals may include, for example, pan, wipe, clean, restore, page up, page down, search, migrate, and zoom. Pan provides for horizontal screen display adjustment. Wipe provides for clearing a screen display. Clean provides for removing artifacts from a screen display. Restore provides for restoring a wiped screen display. Page up and page down provides for vertical screen display adjustment. Search provides for some searching capability which may include: a scroll search that operates by scrolling through a document over a fixed or user specified number of pages; a percentage scroll search that operates by scrolling through a document over a fixed or user specified percentage; or a page search that operates by retrieving a user specified page number. Migrate provides for switching either the entire screen or the application focus between a BILF and an REHF. In some embodiments, applications may utilize a BILF and an REHF displays simultaneously. For example, one bible study application could use a REHF display to search a desired bible verse while using a BILF display to show the content pages including the verse. A key benefit of embodiments described herein is the ability to take advantage of a fast, interactive, and colorful REHF display such as an LCD in conjunction with reading BILF display such as an EPD, which provides a bistable, highly reflective, high contrast display that is more natural for reading.

Figure 5:
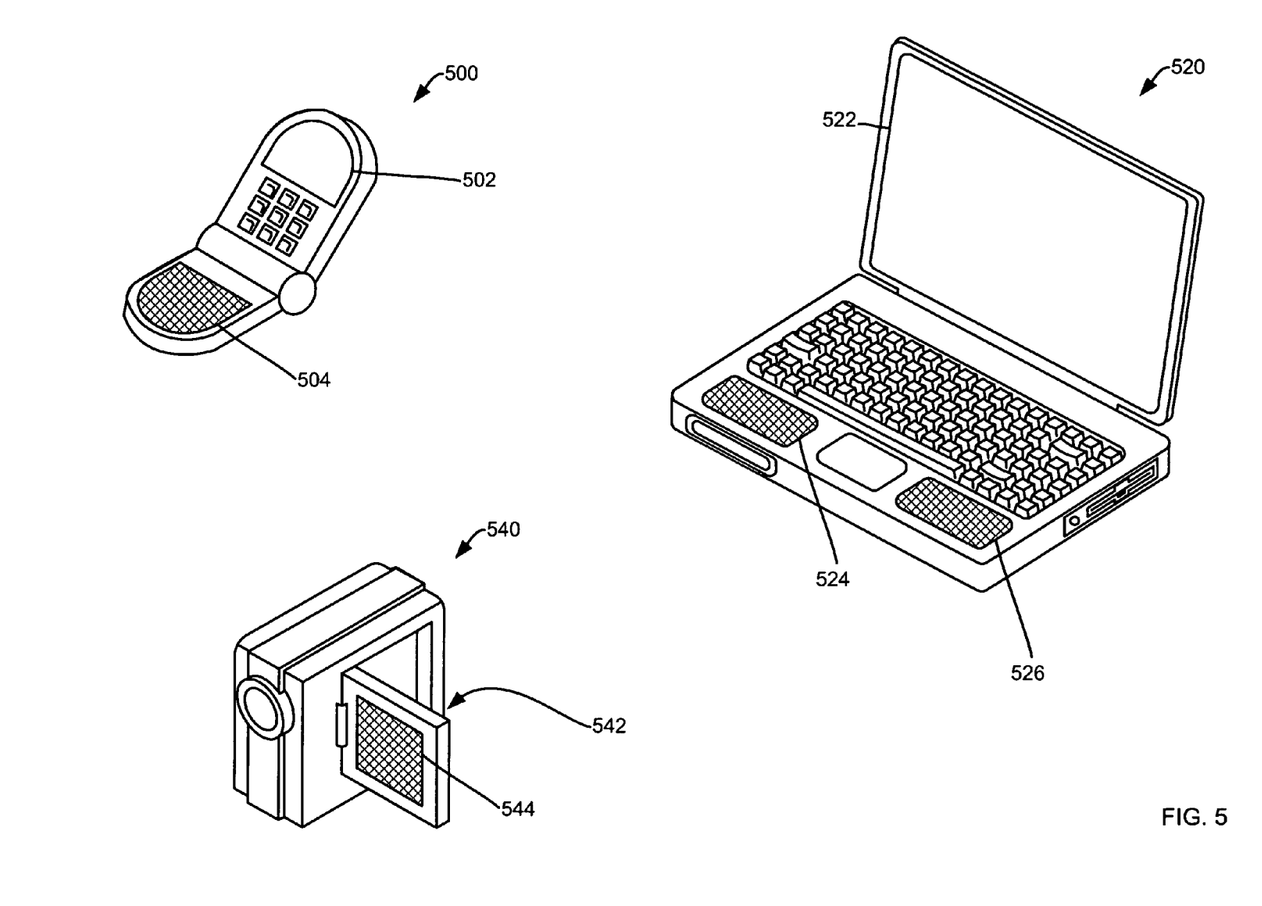
FIG. 5 includes illustrative representations of various complementary dual screen embodiments in accordance with embodiments of the present invention.

FIG. 5 includes illustrative representations of various complementary dual screen embodiments in accordance with embodiments of the present invention. Thus, for example, in an embodiment, a cellular phone 500 may be configured with complementary dual displays 502 and 504. Likewise, in an embodiment, a portable computing device 520 may be configured with complementary dual displays 522 and 524. In some embodiments, a third complementary display 526 may be included. In some embodiments, a control signal, (i.e. select display), may be utilized to select a complimentary dual-display in this case. Likewise, in an embodiment, a video camera 540 may be configured with complementary dual displays 542 and 544. It may be appreciated that the illustrated embodiments are provided for illustrative purposes only and should not be considered limiting. Thus, placement of displays, number of displays, and types of devices configured for use with complementary dual displays may be utilized without limitation without departing from the present invention. For example, devices that utilize embodiments described herein may include: a personal digital assistant, a cellular phone, a portable computing device, a computer, a video camera, a digital media player, a digital game player, an electronic textbook, and a GPS device without departing from the present invention.

Figure 6:
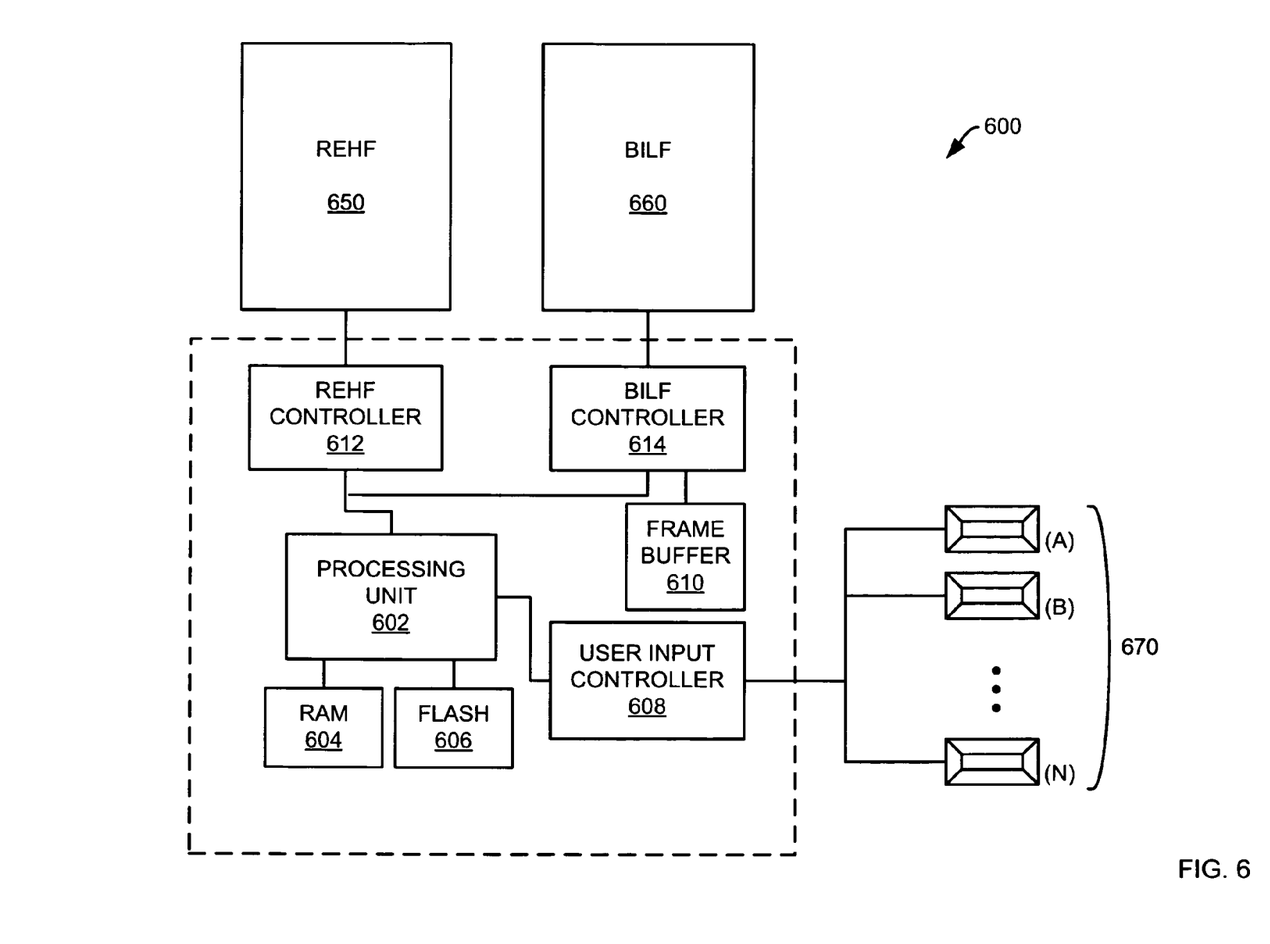
FIG. 6 is a schematic representation of a system architecture for providing complementary dual screens in accordance with embodiments of the present invention.

FIG. 6 is a schematic representation of a system architecture 600 for providing complementary dual screens in accordance with embodiments of the present invention. System architecture 600 includes a number of interconnected components. Processing unit 602 may be coupled with a number of components. Processing units may include any number of suitable processors without departing from the present invention. Processing unit 602 may be coupled with RAM 604 for providing volatile memory storage and flash memory 606 for providing non-volatile memory storage. Processing unit 602 may be configured to send an internal video signal to refresh-based, high frame rate (REHF) controller 612, which may then send the internal video signal to REHF display 650. Embodiments utilizing REHF displays may include: an LCD, a CRT display, an LED display, a PLED display, an OLED display, and a plasma display, which may be utilized equally without departing from the present invention. In other embodiments, REHF displays may be configured to a frame rate in the range of approximately 10 to 120 fps; more preferably to a frame rate of approximately 30 fps.

Processing unit 602 may be further configured to send an internal video signal to bistable, low frame rate (BILF) controller 614, which may then send the internal video signal to BILF display 660. In one embodiment, the BILF display is an EPD. In some embodiments, BILF displays may be configured to a frame rate in the range of approximately less than 1 to 2.5 fps; more preferably to a frame rate of up to approximately 10 fps. BILF controller 614 may be coupled with frame buffer 610. Frame buffer 610 provides storage for storing currently viewed and previously viewed frames for recall to a BILF display. In one embodiment, frame buffers are configured to provide a FIFO queue. In some embodiments, the frame buffer is configured to store a number of frames in the range of approximately 5 to 10 frames, more preferably more than 10 frames. It may be appreciated that while frame buffer 610 is illustrated separately from RAM 604 and flash memory 606, in some embodiments, a physically separate memory is not always necessary or desirable. That is, frame buffers may, in some embodiments, share physical memory space with RAM, flash memory, or both. Any number of other buffers may be utilized in a similar manner without departing from the present invention. For example, a zoom buffer (not shown) may be utilized to store frames having various levels of zoom; a composite buffer (not shown) may be utilized to provide an index of frames stored in the frame buffer; and a flip buffer (not shown) may be utilized to provide a flipped frame of a current frame in the frame buffer.

Processing unit 602 may be further configured to receive control signals based on user input from user input controller 608. Control signals may include, for example, pan, flip, wipe, clean, restore, page up, page down, search, migrate, and zoom. Pan provides for horizontal screen display adjustment. Flip provides for flipping a screen display upside down when a device is moved from a half-open position, such as half-open position 320, to a full-open position, such as full-open position 300 (see FIG. 3). Wipe provides for clearing a screen display. Clean provides for removing artifacts from a screen display. Restore provides for restoring a wiped screen display. Page up and page down provides for page changing. Search provides for some searching capability which may include: a scroll search that operates by scrolling through a document over a fixed or user specified number of pages; a percentage scroll search that operates by scrolling through a document over a fixed or user specified percentage; or a page search that operates by retrieving a user specified page number. Migrate provides for switching either the entire screen or the application focus between a BILF and an REHF. In some embodiments, applications may utilize a BILF and an REHF displays simultaneously. For example, one bible study application could use a REHF display to search a desired bible verse while using a BILF display to show the content pages including the verse. A key benefit of embodiments described herein is the ability to take advantage of a fast, interactive, and colorful REHF display such as an LCD in conjunction with reading BILF display such as an EPD, which provides a bistable, highly reflective, high contrast display that is more natural for reading.

User input controller 608 may be configured to receive input from any number of user input interfaces 670A-N. As noted above, any number of configurations of user input interfaces may be utilized without departing from the present invention. For example, in one embodiment, a user input interface may be configured as a button having any number of shapes. In another embodiment, a user input interface may include multipurpose buttons. As may be appreciated, user input interfaces may be configured in any of a number of positions without departing from the present invention.

In some embodiments, processing unit 602 may be configured to provide power savings methods. Thus, in one embodiment, a REHF display may be configured to power down after a default or user selected time interval when a BILF display is powered up. In some embodiments, the time interval is in the range of approximately 1 to 10 seconds. In other embodiments, the time interval is in the range of approximately 11 to 60 seconds.

Figure 7:
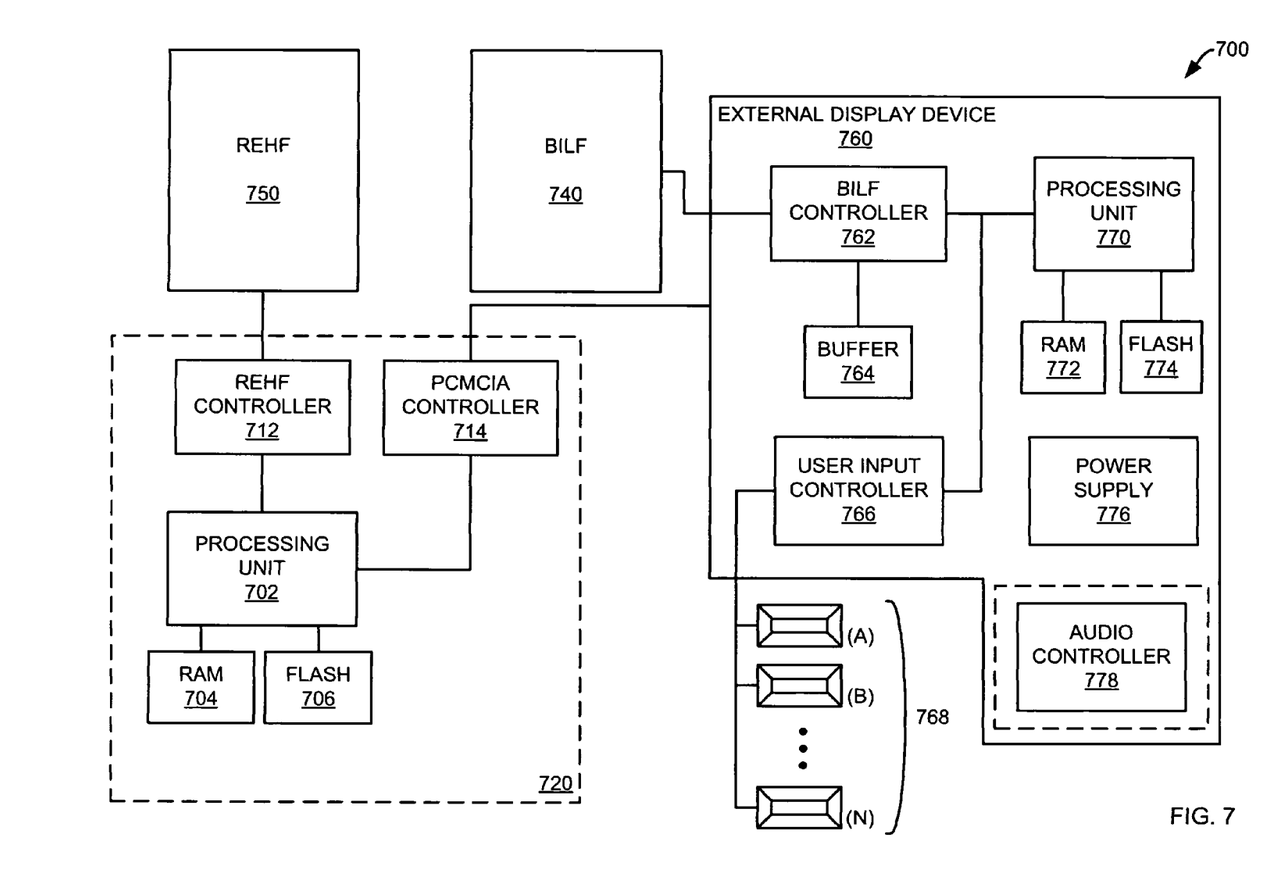
FIG. 7 is an illustrative representation of a system architecture for providing detachable complementary dual screens in accordance with embodiments of the present invention.

FIG. 7 is an illustrative representation of a system architecture 700 for providing detachable complementary dual screens in accordance with embodiments of the present invention. System architecture 700 includes a number of interconnected components. Electron device 720 includes a number of components for providing computing power and functionality. Processing unit 702 may be coupled with a number of components. Processing units may include any number of suitable processors without departing from the present invention. Processing unit 702 may be coupled with RAM 704 for providing volatile memory storage and flash memory 706 for providing non-volatile memory storage. Processing unit 702 may be configured to send an internal video signal to refresh-based, high frame rate (REHF) controller 712, which may then send the internal video signal to REHF display 750. Embodiments utilizing REHF displays may include: an LCD, a CRT display, an LED display, a PLED display, an OLED display, and a plasma display, which may be utilized equally without departing from the present invention. In some embodiments, an REHF may be utilized which have a resolution in the range of approximately 90 to 230 pixels per inch (PPI). In other embodiments, an REHF may be utilized which have a resolution of up to approximately 600 PPI. In some embodiments, REHF displays may be utilized which are configured to a frame rate in the range of approximately 10 to 120 frames per second (fps); more preferably to a frame rate of approximately 30 fps.

Processing unit 702 may be further configured to function cooperatively with controller 714. In the illustrated embodiment, controller is a PCMCIA controller. As may be appreciated, however, any suitable controller may be utilized. Thus, controllers may be utilized that provide functionality with devices such as, SDIO enabled devices, USB enabled devices, Serial port enabled devices, DVI enabled devices, Bluetooth enabled devices, 802.11 a enabled devices, 801.11b enabled devices, 802.11g enabled devices, 2.4 GHz wireless enabled devices, IR wireless enabled devices, and ultra wide band enabled devices, which may be utilized without limitation without departing from the present invention. Thus, controller 714 may be utilized to communicate with external display device 760. External display device 760 also includes a number of components. Thus, for example, external display device 760 includes a BILF display 740, which is configured to receive a video signal from BILF controller 762. In one embodiment, the BILF display is an EPD. In some embodiments, BILF displays may be configured to a frame rate in the range of approximately less than 1 to 2.5 fps; more preferably to a frame rate of up to approximately 10 fps. BILF controller 762 may be coupled with frame buffer 764. Frame buffer 764 provides storage for storing currently viewed and previously viewed frames for recall to a BILF display. In one embodiment, frame buffers are configured to provide a FIFO queue. In some embodiments, the frame buffer is configured to store a number of frames in the range of approximately 5 to 10 frames, more preferably more than 10 frames. It may be appreciated that while frame buffer 764 is illustrated separately from RAM 772 and flash memory 774, in some embodiments, a physically separate memory is not always necessary or desirable. That is, frame buffers may, in some embodiments, share physical memory space with RAM, flash memory, or both.

External display device may also include processing unit 770, which may be coupled with a number of components. Processing units may include any number of suitable processors without departing from the present invention. Processing unit 770 may be coupled with RAM 772 for providing volatile memory storage and flash memory 774 for providing non-volatile memory storage. Processing unit 770 may further be configured to receive control signals based on user input from user input controller 766. Control signals may include, for example, pan, wipe, clean, restore, page up, page down, search, migrate, and zoom. Pan provides for horizontal screen display adjustment. Wipe provides for clearing a screen display. Clean provides for removing artifacts from a screen display. Restore provides for restoring a wiped screen display. Page up and page down provides for vertical screen display adjustment. Search provides for some searching capability which may include: a scroll search that operates by scrolling through a document over a fixed or user specified number of pages; a percentage scroll search that operates by scrolling through a document over a fixed or user specified percentage; or a page search that operates by retrieving a user specified page number. Migrate provides for switching either the entire screen or the application focus between the BILF and REHF. User input controller 766 may be configured to receive input from any number of user input interfaces 768A-N. As noted above, any number of configurations of user input interfaces may be utilized without departing from the present invention. For example, in one embodiment, a user input interface may be configured as a button having any number of shapes. In another embodiment, a user input interface may include multipurpose buttons. As may be appreciated, user input interfaces may be configured in any of a number of positions without departing from the present invention.

In some embodiments, processing unit 770 may be configured to provide services in addition to BILF display. For example, in one embodiment, an audio controller 778 may be utilized to provide audio playback. In some embodiments, an audio interface (not shown) may be utilized for connecting with an audio listening device. Any suitable audio controller having audio playback capability may be utilized without departing from the present invention. In addition, in some embodiments, a power supply 776 may be utilized to provide power when the device is not connected with another electronic device. In some embodiments, the power supply is an internally housed battery. In other embodiments, the power supply is an external power supply. As may be appreciated, power supplies are well-known in the art and may be utilized without limitation without departing from the present invention. In some embodiments, processing unit 770 may connect with an integrated REHF display via a REHF controller (not shown in FIG. 7). An integrated REHF display may offer a complimentary dual-display when no dedicated electronic device is connected with the BILF display.

Figure 8:
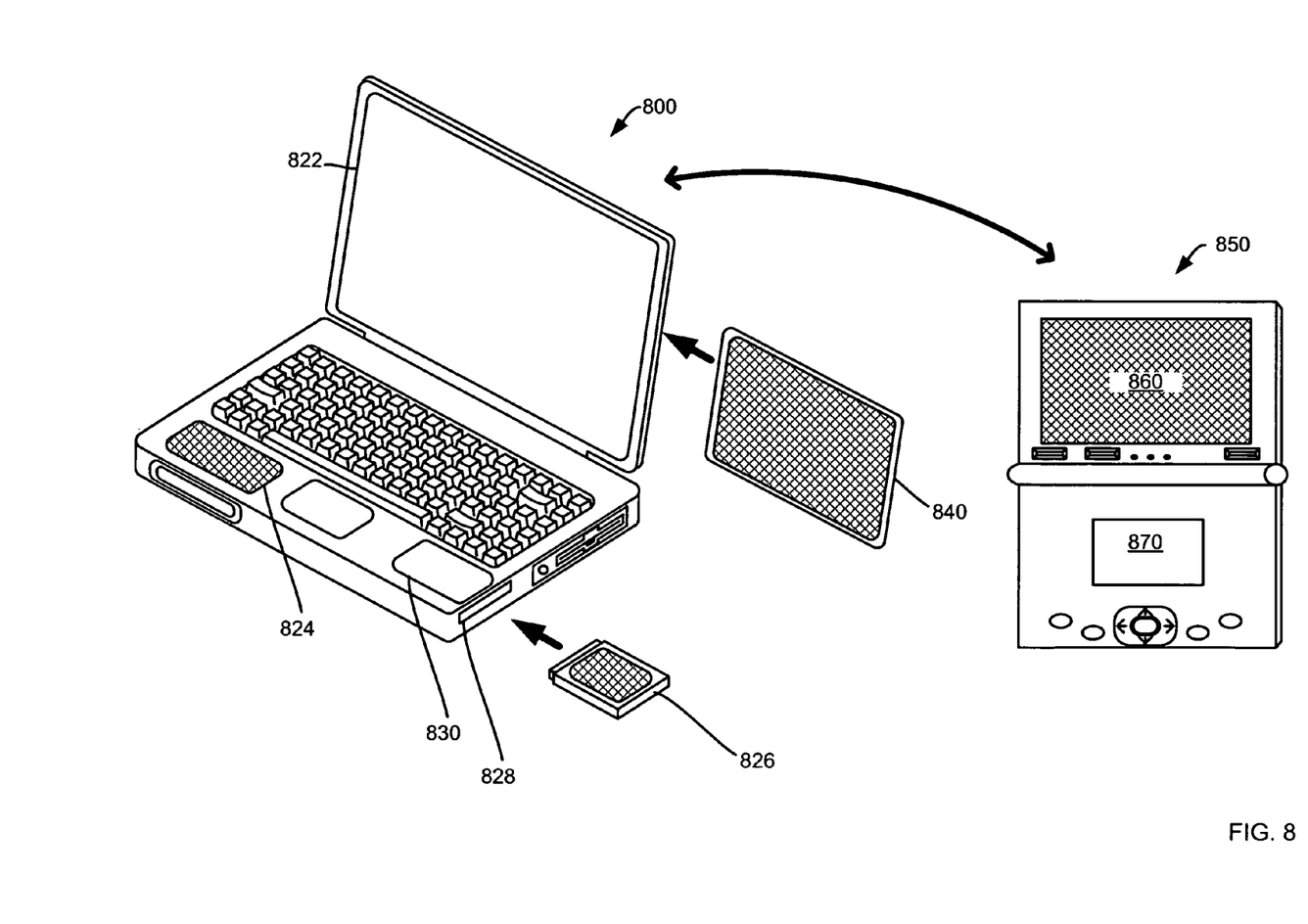
FIG. 8 is an illustrative representation of detachable BILF displays utilized in a complementary dual screen embodiment in accordance with embodiments of the present invention.

FIG. 8 is an illustrative representation of detachable BILF displays 826, 840 and 860 utilized in a complementary dual screen embodiment in accordance with embodiments of the present invention. In an embodiment, a portable computing device 800 may be configured with complementary dual displays 822 and 826. In the embodiment illustrated, BILF display 826 is configured to a PCMCIA form factor. Portable computing device 800 includes a PCMCIA slot 828 for receiving BILF display 826. An optional viewing port 830 may be configured to provide visual access to BILF display 826 when the display is connected with portable computing device 800. When BILF display 826 is connected with portable computing device 800, the device functions as complementary dual displays as described above. When BILF display 826 is not connected with portable computing device 800, the display may be utilized as a separate viewing device having a number of user input interfaces as described for FIG. 7 above.

In addition, BILF display 840 may be detachably connected with portable computing device 800. When connected, the device functions as complementary dual displays as described above. When BILF display 826 is not connected with portable computing device 800, the display may be utilized as a separate viewing device having a number of user input interfaces as described for FIG. 7 above. As may be appreciated, a wired or wireless connection may be utilized, in some embodiments, to connect BILF display 840 with portable computing device 800. Thus, in a wireless embodiment, when BILF display 840 is physically separated from portable computing device 800, images may be transmitted to the display and commands may be transmitted to the computing device. In another embodiment, BILF display 860 (of separate electronic device 850) may be detachably connected with portable computing device 800. When connected, BILF display 860 and REHF display 822 display may function as complimentary dual-displays as disclosed herein. In this embodiment, electronic device 850 acts as an external display device to portable computing device 800 when connected. In some embodiments, a control signal may be utilized to select either REHF display 822 or REHF display 870 as a complimentary dual-display with BILF display 860.

Figure 9:
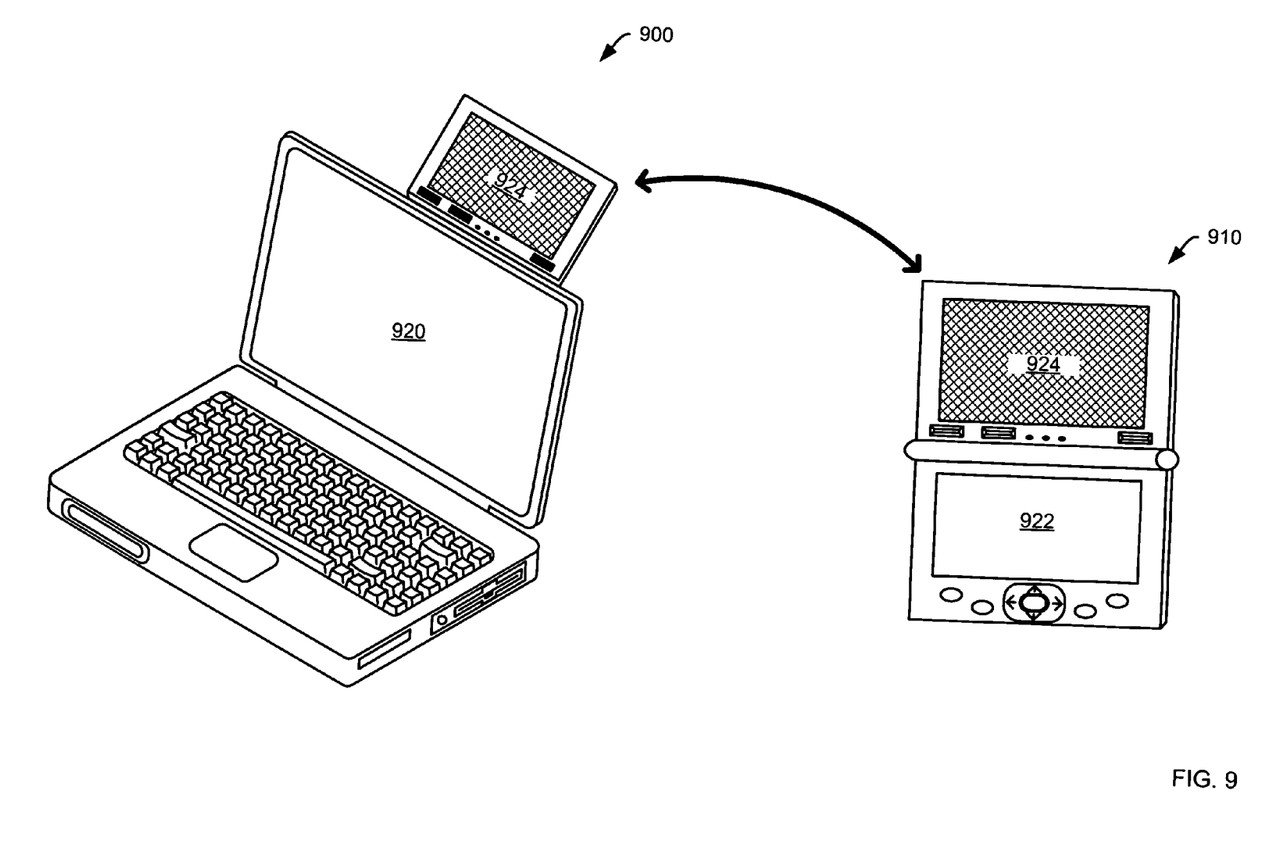
FIG. 9 is an illustrative representation of detachable BILF display utilized in a complementary dual screen embodiment in accordance with embodiments of the present invention.

FIG. 9 is an illustrative representation of a detachable BILF display 924 utilized in a complementary dual screen embodiment in accordance with embodiments of the present invention. In an embodiment, BILF display 924 may be detachably connected with computing device 900 having an REHF display 920. When connected with computing device 900, BILF display 924 and REHF display 920 may function as complementary dual displays as described above. Furthermore, when detached from computing device 900, BILF display 924 may be further attached with electronic device 910 having a REHF display 922. Thus, BILF display 924 and REHF display 922 may function as complementary dual displays as described above for FIG. 3. It may thus be appreciated that a BILF display may be attached with multiple sources having REHF displays for providing a highly readable display. It may be further appreciated that BILF displays may be utilized in tandem with or apart from a corresponding electronic device without departing from the present invention. It may be still further appreciated that the illustrated embodiment is provided for illustrative purposes only and should not be considered limiting. Thus, placement of external displays, number of external displays, and types of devices configured for use in a complementary dual display system may be utilized without limitation without departing from the present invention. For example, devices that utilize embodiments described herein may include: a personal digital assistant, a cellular phone, a portable computing device, a computer, a video camera, a digital media player, a digital game player, an electronic textbook, and a GPS device without departing from the present invention.

While this invention has been described in terms of several preferred embodiments, there are alterations, permutations, and equivalents, which fall within the scope of this invention. It should also be noted that there are many alternative ways of implementing the methods and apparatuses of the present invention. Although various examples are provided herein, it is intended that these examples be illustrative and not limiting with respect to the invention. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. An electronic device having complementary dual displays, the electronic device comprising:
   a primary display device comprising:
      a first display, wherein the first display is a refresh-based, high frame rate display,
      a first display controller for outputting video signals to the first display,
      a processing unit configured to generate video signals based on instructions from an application being executed by the processing unit, the processing unit coupled to the first display controller to provide video signals thereto, wherein at least one of the generated video signals is based on feedback instructions from the application to update the first display, the feedback instructions indicative of a video signal displayed on an external display device that corresponds to an intermediate location within a first page of information currently displayed on the external display device, and
a wireless communication interface coupled to the processing unit to receive video signals therefrom; and
the external display device comprising:
a second display, wherein the second display is a bistable, low frame rate display, and
a second display controller wirelessly coupled to the processing unit of the primary display device via the wireless communication interface of the primary display device to receive video signals therefrom, the second display controller configured to output the received video signals to the second display, the received video signals including a video signal to display the intermediate location with the first page of information.

2. The electronic device of claim 1 wherein the second display controller further includes a frame buffer for storing a number of frames for display on the second display.

3. The electronic device of claim 2 wherein number of frames stored is in the range of approximately 5 to 10 frames.

4. The electronic device of claim 2 wherein number of frames stored is greater than approximately 10 frames.

5. The electronic device of claim 1 wherein the first display is selected from the group consisting of: an LCD display, a CRT display, and LED display, a PLED display, an OLED display, and a plasma display.

6. The electronic device of claim 1 wherein the first display is configured with a first screen resolution of up to approximately 600 pixels per inch (PPI).

7. The electronic device of claim 1 wherein the first display is configured with a first resolution in the range of approximately 90 to 230 PPI.

8. The electronic device of claim 1 wherein the first display is configured to refresh at a rate up to approximately 30 frames-per-second (fps).

9. The electronic device of claim 1 wherein the first display is configured to refresh at a rate in a range of approximately 10 to 120 fps.

10. The electronic device of claim 1 wherein the second display is an electronic paper display (EPD).

11. The electronic device of claim 1 wherein the second display is configured with a second screen resolution of at least approximately 100 dots per inch (DPI).

12. The electronic device of claim 1 wherein the second display is configured to refresh at rate of up to approximately 10 fps.

13. The electronic device of claim 1 wherein the second display is configured to refresh at a user selectable rate in a range of approximately less than 1 to 2.5 fps.

14. The electronic device of claim 1 wherein the control signal is selected from the group consisting of: pan, flip, wipe, clean, restore, page up, page down, search, and zoom.

15. The electronic device of claim 1 wherein the first display is configured to power down after a time interval when the second display is powered up.

16. The electronic device of claim 15 wherein time interval is in a range of approximately 1 to 10 seconds.

17. The electronic device of claim 15 wherein the time interval is in the range of approximately 11 to 60 seconds.

18. The electronic device of claim 1 wherein the electronic device is selected from the group consisting of: a personal digital assistant, a cellular phone, a portable computing device, a computer, a video camera, a digital media player, a digital game player, an electronic textbook, and a GPS device.

19. The electronic device of claim 1 further comprising:
a third display, wherein the third display is a bistable, low frame rate display; and
a third display controller for outputting the internal video signal to the third display.

20. The electronic device of claim 1 wherein the second display is configured to operate with a second electronic device, the second electronic device comprising:
a fourth display, wherein the fourth display is a refresh-based, high frame rate display;
a fourth display controller for outputting an internal video signal to the fourth display; and
an additional second display controller for outputting the internal video signal to the second display.

21. An electronic device having complementary dual displays, the electronic device comprising:
a primary display device comprising:
first display means, wherein the first display means is a refresh-based, high frame rate display,
first display controller means for outputting video signals to the first display means,
processing unit means configured to:
generate video signals based on instructions from an application being executed by the processing unit, the processing unit means coupled to the first display controller means to provide video signals thereto, wherein at least one of the generated video signals is based on feedback instructions from the application to update the first display, the feedback instructions indicative of a video signal displayed on an external display device that corresponds to an intermediate location within a first page of information currently displayed on the external display device, and
wireless communication interface means coupled to the processing unit means to receive video signals therefrom; and
the external display device comprising:
second display means, wherein the second display means is a bistable, low frame rate display,
second display controller means wirelessly coupled to the processing unit means of the primary display device via the wireless communication interface means of the primary display device to receive video signals therefrom, the second display controller means configured to output the received video signals to the second display means, the received video signals including a video signal to display the intermediate location with the first page of information, wherein the second display controller means includes a frame buffer for storing a number of frames for display on the second display means,
plurality of user input interface means for receiving a user input, wherein the plurality of user input interface means are configured to control the second display means, and
user input controller means for generating a control signal based on the user input, the user input controller means in electronic communication with the plurality of user input interface means and processing means of the electronic device.

22. The electronic device of claim 21 further comprising:
third display means, wherein the third display means is a bistable, low frame rate display; and
third display controller means for outputting the internal video signal to the third display means.

23. An external display device for use as a complementary display with an electronic device, the electronic device having a first display and a processing unit configured to generate video signals based on instructions from an application being executed by the processing unit, the external display device comprising:
- an external display, wherein the external display is a bistable, low frame rate display, wherein the external display is configured to operate substantially simultaneous with the first display, and wherein the external display is further configured to operate independently of the electronic device;
- an external display controller for outputting video signals to the external display, at least one of the video signals to display an intermediate location within a first page of information currently displayed on the external display, wherein the at least one video signal causes the processing unit to generate a video signal based on feedback instructions from the application to update the first display in response to the display of the intermediate location on the external display;
- a frame buffer for storing a number of frames for display on the external display;
- a connection interface for electronically and wirelessly connecting the external display controller with the electronic device to receive video signals therefrom, the external display controller configured to output the received video signals to the external display;
- a plurality of user input interfaces for receiving a user input, wherein the plurality of user input interfaces are configured to provide control for the external display;
- a user input controller for generating a control signal based on the user input, the user input controller in electronic communication with the plurality of user input interfaces; and
- a power supply for providing power when the external display device is not connected with the electronic device.

24. The external display device of claim 23 further comprising:
- a processing unit for providing computing functions for the device and for processing the control signal;
- a random access memory (RAM) storage device for providing volatile storage for the processing unit; and
- a flash memory storage device for providing non-volatile storage for the processing unit.

25. The external display device of claim 24 wherein the frame buffer is configured to utilize the RAM storage device for storing the number of frames.

26. The external display device of claim 24 wherein the frame buffer is configured to utilize the flash memory storage device for storing the number of frames.

27. The external display device of claim 23 wherein the connection interface is a wired connection selected from the group consisting of: PCMCIA, SDIO, USB, Serial, and DVI.

28. The external display device of claim 23 wherein the connection interface is a wireless connection selected from the group consisting of: Bluetooth, 802.11a, 801.11b, 802.11g, 2.4 GHz wireless, IR wireless, and ultra wide band.

29. The external display device of claim 23 wherein the external display includes an electronic paper device (EPD).

30. The external display device of claim 23 wherein the external display is configured with a screen resolution of at least approximately 100 DPI.

31. The external display device of claim 23 wherein the second display is configured to refresh at rate of up to approximately 10 fps.

32. The external display device of claim 23 wherein the second display is configured to refresh at a user selectable rate in a range of approximately less than 1 to 2.5 fps.

33. The external display device of claim 23 wherein the control signal is selected from the group consisting of: pan, wipe, clean, restore, page up, page down, search, migrate, and zoom.

34. The external display device of claim 23 wherein the electronic device is selected from the group consisting of: a personal digital assistant, a cellular phone, a portable computing device, a computer, a video camera, a digital media player, a digital game player, an electronic textbook, an ultra mobile personal computing device, and a GPS device.

35. The external display device of claim 34 wherein the external display device further comprises:
- an audio controller for providing audio playback; and
- an audio interface for connecting with an audio listening device.

36. The external display device of claim 34 where the external display device further comprises:
- a second display, wherein the second display is a refresh-based, high frame rate (REHF) display; and
- a second display controller for outputting the video signal to the second display.

37. The external display device of claim 36 further comprising a control signal configured to select one of the first display and the second display for use as a complimentary display.

* * * * *